United States Patent
Arrasmith

(10) Patent No.: US 8,976,259 B2
(45) Date of Patent: Mar. 10, 2015

(54) METHODS AND SYSTEMS FOR MODIFIED WAVELENGTH DIVERSITY IMAGE COMPENSATION

(71) Applicant: Greywolf Technical Services, Inc., Melbourne, FL (US)

(72) Inventor: William W Arrasmith, Melbourne, FL (US)

(73) Assignee: Greywolf Technical Services, Inc., Melbourne, FL (US)

(*) Notice: Subject to any disclaimer, the term of this patent is extended or adjusted under 35 U.S.C. 154(b) by 149 days.

(21) Appl. No.: 13/779,365

(22) Filed: Feb. 27, 2013

(65) Prior Publication Data
US 2013/0222615 A1    Aug. 29, 2013

Related U.S. Application Data

(60) Provisional application No. 61/603,706, filed on Feb. 27, 2012, provisional application No. 61/609,756, filed on Mar. 12, 2012.

(51) Int. Cl.
*H04N 5/228* (2006.01)
*G06K 9/40* (2006.01)
*G06T 5/50* (2006.01)
*G06T 5/00* (2006.01)

(52) U.S. Cl.
CPC .. G06T 5/50 (2013.01); G06T 5/003 (2013.01)
USPC ...................................... 348/222.1; 382/260

(58) Field of Classification Search
USPC ........ 348/222.1, 241, 242; 382/255, 260, 275
See application file for complete search history.

(56) References Cited

U.S. PATENT DOCUMENTS

| | | | |
|---|---|---|---|
| 5,384,455 A * | 1/1995 | Paxman | 250/201.9 |
| 5,841,911 A * | 11/1998 | Kopeika et al. | 382/254 |
| 6,429,415 B1 * | 8/2002 | Rhoads | 250/208.1 |
| 7,274,442 B2 | 9/2007 | Dolne et al. | |
| 7,659,935 B1 * | 2/2010 | Gonsalves | 348/335 |
| 8,447,129 B2 * | 5/2013 | Arrasmith | 382/260 |
| 2007/0278386 A1 * | 12/2007 | Paxman et al. | 250/208.1 |
| 2012/0013812 A1 | 1/2012 | Gollier | |
| 2012/0242831 A1 * | 9/2012 | Restaino et al. | 348/135 |
| 2012/0288212 A1 | 11/2012 | Arrasmith | |
| 2012/0314948 A1 * | 12/2012 | Raveendran et al. | 382/173 |
| 2013/0100308 A1 * | 4/2013 | Schutte | 348/222.1 |

FOREIGN PATENT DOCUMENTS

CN          101159856 A       4/2008

OTHER PUBLICATIONS

Ingleby et al.; "Experimental results of parallel multiframe blind deconvolution using wavelength diversity"; Dec. 9, 2004; Proc. of SPIE; vol. 5578.*

(Continued)

*Primary Examiner* — John Villecco
(74) *Attorney, Agent, or Firm* — Duane Morris LLP

(57) ABSTRACT

Imaging methods and systems providing wavelength diversity compensation to images distorted by turbulence includes capturing a subject image set in a single image frame, with the images in the set being captured at diverse wavelengths. The compensation includes using an error metric insensitive to variation in object brightness between a region of interest of an image and a corresponding region of interest in a second image in the set that is at a diverse wavelength.

19 Claims, 6 Drawing Sheets

(56) References Cited

OTHER PUBLICATIONS

Arrasmith et al.; "Novel wavelength diversity technique for high speed atmospheric turbulence compensation"; Apr. 23, 2010; Proc. of SPIE; vol. 7666.*

Dionne et al.; "Imaging through an optical waveguide with wavelength diversity"; Feb. 1, 2004; Opt. Eng; pp. 445-449.*

Arrasmith et al.; "Parallel implemenation of high-spped, phase diverse atmospheric turbulence compensation method on a neural network-based architecture"; Apr. 3, 2008; Proc. of SPIE; vol. 6943.*

International Searching Authority, International Search Report corresponding to International Application No. PCT/US2013/028048, mailed Jun. 20, 2013, 1page.

R.G. Paxman, B.J. Thelen, and J.H. Seldin, "Phase-Diversity Correction of Turbulence-Induced Space-Variant Blur," Optics Letters, vol. 19, No. 16, pp. 1231-1233, 1994.

M. Aubailly, M. Vorontsov et al., "Automated Video Enhancement from a Stream of Atomospherically-distorted Image, the Lucky-Region Fusion Approach," Proc. SPIE 7463, 74630C (2009).

F. Ortiz, C.J. Carrano et al.,"Special-Purpose Hardware for Real-Time Compensation of Atmospheric Effects in Long-Range Imaging," Atmospheric Optical Modeling, Measurement, and Simulation II, Proc. SPIE vol. 6303 (2006).

F. Ortiz, C.J. Carrano et al., "Reconfigurable Device for Enhancement of Long-Range Imagery," Airborne Intelligence, Surveillance, Reconnaissance (ISR) Systems and Applications IV, Proc. SPIE vol. 6546 (2007).

D. Korff, "Analysis of a Method for Obtaining Near-Diffraction-Limited Information in the Presence of Atmospheric Turbulence," J. Opt. Soc. Am., vol. 63, No. 8, pp. 971-980, 1973.

R.A. Gonsalves, "Phase Retrieval from Modulus Data," J. Opt. Soc. Am., vol. 66, No. 9, Sep. 1976.

R.A. Gonsalves and R. Chidlaw, "Wavefront Sensing by Phase Retrieval," Applications of Digital Image Processing III, SPIE vol. 207, 1979.

H.R. Ingleby and D.R. McGaughey, "Parallel Multiframe Blind Deconvolution Using Wavelength Diversity," Image Reconstruction from Incomplete Data III, Edited by Bones, Philip J.; Fiddy, Michael A.; Millane, Rick P., Proceedings of the SPIE, vol. 5562, pp. 58-64, Oct. 2004.

* cited by examiner

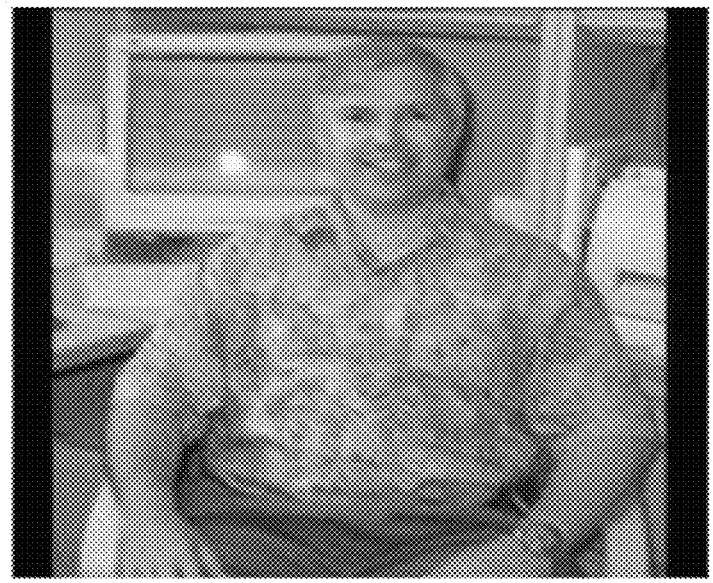
Fig. 3

METHODS AND SYSTEMS FOR MODIFIED WAVELENGTH DIVERSITY IMAGE COMPENSATION

CROSS REFERENCE TO RELATED APPLICATIONS

This application claims the priority benefit of U.S. Provisional Patent Application No. 61/603,706, filed on Feb. 27, 2012, the entirety of which is hereby incorporated by reference. This application further claims the priority benefit of U.S. Provisional Patent Application No. 61/609,756, filed on Mar. 12, 2012, the entirety of which is hereby incorporated by reference.

FIELD

This disclosure relates generally to wavelength diversity compensation of images, and more specifically to compensation for turbulence effects in imaging systems using optical devices such as cameras, video recording devices, and other color and black and white instruments.

BACKGROUND

The ability to view an object is limited by turbulence existing in the line of sight between the viewer and the object. Such turbulence may exist in the atmosphere, including a body of air, or in other intervening mediums, such as fluids. As is known, atmospheric turbulence is primarily caused by non-uniform heating and wind, and includes both naturally occurring and man-made turbulence, such as the atmospheric turbulence in the wake of a jet engine.

Passive incoherent imaging techniques such as phase diversity and wavelength diversity have long been used to compensate for the negative effects of atmospheric turbulence on conventional imaging systems. Both of these diversity schemes traditionally use iterative 2-D Fourier transforms in a sequential error-reduction methodology that is typically slow and relegated to post-processing applications.

Atmospheric coherence length, $r_0$, is a measure of the effect of atmospheric turbulence on optical propagation. A larger value implies weaker turbulence. For optical imaging systems having apertures that are significantly larger than the atmospheric coherence length, $r_0$ (Fried parameter), the turbulent atmosphere usually is the most significant contributor to the imaging system's loss of spatial resolution. Atmospheric turbulence introduces aberrations that can significantly degrade the performance of an optical imaging system. The degradation in imaging performance depends on a variety of factors, such as the operating wavelength(s), the relative size of the imaging system's entrance pupil diameter as compared to the atmospheric coherence length, $r_0$, the angular instantaneous field of view (IFOV) as compared to the isoplanatic angle, $\theta_0$, sampling effects, signal-to-noise issues, and system effects such as imperfect optics, fixed pattern noise and platform jitter.

Given a circular aperture, the upper bound on achievable resolution is the so-called diffraction limit, $$\Delta x_{diff} = 1.22 \frac{\overline{\lambda}}{D} z, \qquad (1)$$

where $\overline{\lambda}$ is the center wavelength of the illuminating light, D is the diameter of the entrance pupil of the imaging system (for example, the diameter of a telescope, or camera lens), and z is the distance between the imaging system's entrance pupil and the object/target to be imaged. For example, an object located 2 km from a camera with a 4½ inch lens would have a diffraction-limited resolution of 1.059 cm at a center wavelength of 500 nm. This means that object features less than this size will not be resolved and object features larger than this size will be resolved if diffraction-limiting imaging conditions are attained.

Unfortunately, the atmosphere severely degrades the ability to achieve the diffraction-limited resolution indicated in equation (1). Instead, the conventionally attainable maximum resolution of an imaging system that is looking through atmospheric turbulence is given by, $$\Delta x_{atm} = 1.22 \frac{\overline{\lambda}}{r_0} z, \qquad (2)$$

where the $r_0$ expression in the denominator of equation (2) is the atmospheric coherence length, or Fried parameter. For imaging over horizontal paths, recent experimental values for $r_0$ have ranged from 1 to 4 cm leading to a "loss" of resolution of 11.52 (for an $r_0$ of 1 cm) to 2.88 (for an $r_0$ of 4 cm) with respect to the diffraction-limited resolution given in equation (1). Stated another way, by compensating for the effects of atmospheric turbulence, a maximum increase in resolution between 2.88 and 11.52 can be expected for the center wavelength and entrance-pupil diameter specified above. These potential effects are even more dramatic when a telescopic imaging system is used. For instance, if an eight-inch telescope is attached to the camera or video camera at optical wavelengths, the maximum increase in spatial resolution for the same values of $r_0$ above jumps to 20.32 (for an $r_0$ of 1 cm) or 5.08 (for an $r_0$ of 4 cm).

As can be seen by dividing equation (2) by equation (1), the potential increase in spatial resolution of an imaging system with entrance-pupil diameter D is given by, $$R = \frac{\Delta x_{atm}}{\Delta x_{diff}} = \frac{D}{r_0}. \qquad (3)$$

With knowledge of the diameter of the imaging system's entrance pupil and the value of $r_0$ for an illuminating wavelength, equation (3) can be used to determine the maximum achievable increase in resolution, neglecting system effects and assuming full compensation of atmospheric turbulence.

The value of $r_0$ at a given wavelength can be scaled to another wavelength by, $$r_0^{\lambda_2} = r_0^{\lambda_1} \cdot \left(\frac{\lambda_2}{\lambda_1}\right)^{\frac{6}{5}}, \qquad (4)$$

where $r_0^{\lambda_1}$ is the value of $r_0$ at wavelength $\lambda_1$ and $r_0^{\lambda_2}$ is the value of $r_0$ at the wavelength of interest $\lambda_2$. For example, if the value of $r_0$ at the illuminating wavelength of 500 nm is 1 cm, then the value of $r_0$ at 1.06 μm is about 2.46 cm. Once the new value of $r_0$ is known, equation (3) can be used to determine the upper bound on the resolution increase of the optical system under consideration. For color images, the resolution increase is different at each wavelength and can be estimated by using the red (R), green (G), and blue (B) wavelengths fundamental to a RGB color scheme.

Equation (4) can be obtained from $$r_0 = 0.185 \left( \frac{\lambda^2}{\int_0^z c_n^2(\xi)\, d\xi} \right)^{\frac{3}{5}}, \quad (5)$$

where the term in the denominator is the integral of the atmospheric structure constant along the optical path [0, z]. Very often in imaging applications, the Fried parameter is parameterized. In this case, the integral in expression (5) can be estimated from the parameter $r_0$.

In order to attain an increase in resolution approaching the limits given by equation (3), the effects of atmospheric turbulence must be de-convolved from the aberrated image. FIG. 1 shows the simulated effects of atmospheric turbulence for a target that is simulated to be 1.3 km away from the optical imaging system. The center wavelength was 550 nm and the distance between the simulated object and the 8-inch telescopic imaging system was 1.3 km. The Fried coherence length was 2 cm. The imaging system itself was assumed to be noise-free to isolate and demonstrate the atmospheric turbulence effects on the resulting image.

Three basic ways to estimate and remove the effects of atmospheric turbulence are adaptive optics systems, post-processing atmospheric turbulence compensation systems and hybrids of the two.

Adaptive optics systems are hardware-based systems that can correct atmospheric-turbulence effects in real-time, for example, at rates faster than 30 Hz. Adaptive optics systems are often cumbersome, require extensive hardware, alignment, and expertise, and are often expensive. They are also predominantly designed for fixed sites and are not typically man-portable, rugged or covert.

Post-processing atmospheric turbulence compensation systems are largely implemented in software (software dominant) but traditionally are very slow (not real-time), and can involve additional hardware. Hybrid methods are a cross between the two and generally relax some of the hardware processing requirements and then correct for the loss in performance using post-processing methods.

Many of the existing software-dominant atmospheric turbulence compensation (deconvolution) approaches such as wavelength diversity, phase diversity, multi-frame blind deconvolution and other post-processing approaches have been predominantly focused on phase-only corrections (near-field turbulence approximation) and have been iterative and slow. There are some exceptions. In "Phase-diversity correction of turbulence-induced space-variant blur", R. Paxman and others ("Paxman") described use of phase diversity for reconstructing the unaberrated object brightness through distributed turbulence. (Optics Letters, Vol. 19, No. 16, pp. 1231-1233, 1994). In "Automated Video Enhancement from a Stream of Atomospherically-distorted Image, the Lucky-Region Fusion Approach", M. Aubailly, M. Vorontsov and others ("Aubailly") described methods for fusing segments of "lucky" image frames to de-blur images obtained over horizontal optical paths. (Proc. SPIE 7463, 74630C, 2009). In "Special-purpose hardware for real-time compensation of atmospheric effects in long-range imaging" and "Reconfigurable device for enhancement of long-range imagery", F. Ortiz, C. J. Carrano and others ("Carrano") generalized the traditional speckle-imaging technique that is and has been used to great effect in astronomy and other near-field turbulence application areas. (Atmospheric Optical Modeling, Measurement, and Simulation II, Proc. SPIE Vol. 6303, 2006, and Airborne Intelligence, Surveillance, Reconnaissance (ISR) Systems and Applications IV, Proc. SPIE Vol. 6546, 2007, respectively).

The approach of Carrano improves the speed of the traditional speckle imaging-based post-processing methods. Carrano's approach parameterized the Korff transfer function in terms of the atmospheric coherence length, $r_0$ to estimate the object magnitude and used the bispectrum technique to estimate the object phase without requiring the presence of a reference source such as a star or laser guide-star. The approach was applied to a horizontal path turbulence scenario with observable improvement in clarity for optical path lengths of 0.5 km to 10 km. Processing was done on a 256 by 256 pixel by 100 image frame data cube using a 1.7 GHz Pentium IV processor. It originally took about 10 seconds to process this data cube, which represented an isoplanatic patch from a 1280 by 1024 image. To recover the full image, 20 similar data cubes must be processed resulting in 200 seconds of processing time for their non-optimized algorithm. Carrano described continuing to improve processing times to approximately 1 second using faster processing equipment.

Nonetheless, there are significant limitations to the Carrano approach. For instance, the Carrano approach could require hundreds of frames of images or more to provide the parameters needed for it to work. The frames require additional processing power and time. The method further requires that the frames capture the same image—necessitating that the subject being viewed is not moving. Limitations such as these make the approach problematic. For example, consider atmospheric turbulence compensating applications that require real-time image processing of uncooperative targets, such as covert surveillance of people for military or law enforcement purposes.

The following is an overview of the optical-systems model used in general-purpose incoherent optical imaging systems.

For many incoherent imaging applications, a linear, shift-invariant imaging model is appropriate, with the optical systems model given by, $$i(\vec{x}) = o(\vec{x}) * |h_t(\vec{x})|^2, \quad (6)$$

where $o(\vec{x})$ is the 2-D pristine object brightness function, $|h_t(\vec{x})|^2$ is the imaging system's point spread function (PSF), $i(\vec{x})$ is the atmospherically degraded (e.g. "blurry") image due to atmosphere and optical imaging system effects, and $\vec{x}$ is a 2-D position vector in the image plane. The asterisk represents 2-D spatial convolution.

By taking the 2-D Fourier transform of both sides of equation (6), the frequency-space equivalent of equation (6) is given by $$I(\vec{f}) = O(\vec{f}) H(\vec{f}), \quad (7)$$

where $I(\vec{f})$ is the image spectrum, $O(\vec{f})$ is the object spectrum, $H(\vec{f})$ is the optical transfer function (OTF) and $\vec{f}$ is a 2-D spatial frequency variable. Equations (6) and (7) apply at each spatial coordinate $\vec{x}$ and at each spatial frequency $\vec{f}$.

The PSF can be related to the optical transfer function by, $$H(\vec{f}) = \frac{\Im\left[|h_t(\vec{x})|^2\right]}{\Im\left[|h_t(\vec{x})|^2\right]_{\vec{f}=0}}, \quad (8)$$

where the symbol, $\Im[\bullet]$, denotes taking the 2-D Fourier transform of the expression inside the brackets. The optical transfer function is seen to be the 2-D Fourier transform of the PSF and then normalized so that the maximum value of the OTF is 1.

The relationship between the optical system's impulse response $h_i(\vec{x})$ and the generalized pupil function (GPF) is given by, $$h_i(\vec{x}) = \mathfrak{I}^{-1}[W(\vec{x})], \quad (9)$$

where $\mathfrak{I}^{-1}[\bullet]$ represents taking the 2-D inverse Fourier transform of the expression inside the brackets, and $$W(\vec{x}) = A(\vec{x}) e^{j\phi(\vec{x})}, \quad (10)$$

is the generalized pupil function (GPF). The function $A(\vec{x})$ is an aperture function that has a value of 1 inside the clear aperture of the telescope and 0 outside of it. The function $\phi(\vec{x})$ is the atmospherically induced phase aberration realized at spatial coordinate $\vec{x}$ in the entrance pupil of the imaging system. In the near-field turbulence approximation model, such as if one is looking up through the atmosphere into space from a ground-based telescope, the amplitude variations are assumed negligible within an isoplanatic patch, and are set to 1. It can be seen that there are two components that make up equation (10)—one due to the imaging system's aperture, and the other due to the effects of atmospheric turbulence.

Traditional "diversity-based" post-processing atmospheric turbulence compensation methods involve inserting a known diversity into the imaging system by some artifice and then simultaneously capturing the original image and the diversity image. The OTFs of the aberrated image and the diversity image are related to each other and a suitable error metric is used to select an error minimized OTF. Ideally, the error minizimed OTF is the OTF that produces the lowest local and global error. Depending on the approach taken, in relating the OTF to the diversity OTF, often the resulting error metric will be a function of the aberrated image spectrum, the diversity image spectrum (both measured) and analytical expressions of the OTF and diversity OTF that are both functions of entrance pupil phase estimates or phase difference estimates. For instance, one phase-diversity post-processing atmospheric turbulence compensation method uses a predetermined additive phase term in the expression of the phase diversity generalized pupil function, $$W_{pd}(\vec{x}) = A(\vec{x}) e^{j(\phi(\vec{x}) + \phi_{pd}(\vec{x}))}, \quad (11)$$

where the subscript pd denotes the phase diversity method was used. The expression $W_{pd}(\vec{x})$ is the phase diversity generalized pupil function and, as shown, has a predetermined phase diversity $\phi_{pd}(\vec{x})$ added to the unknown atmospheric turbulence phase $\phi(\vec{x})$ at every entrance pupil spatial coordinate $\vec{x}$. Often a predetermined quadratic phase factor can be introduced in the phase diversity image by slightly defocusing the diversity image.

Another diversity method is one by which an image is captured simultaneously at two different narrow-band wavelengths centered at $\lambda_1$ and $\lambda_2$. The wavelength diversity generalized pupil function is then given by, $$W_{wd}(\vec{x}) = A(\vec{x}) e^{j\left(\frac{\lambda_1}{\lambda_2}\phi(\vec{x})\right)}. \quad (12)$$

In the traditional diversity-based atmospheric turbulence compensation methods, a diversity OTF is generated by using equations (8) through (10) in reverse order and substituting the appropriate diversity generalized pupil function from equation (11) or (12) depending on which diversity method one is using for equation (10).

A common error metric is then applied at every point in the image spectrum as a way to determine when the OTF estimate is accurate enough. One such error metric is described by Gonsalves and others ("Gonsalves") in "Phase Retrieval from Modulus Data" (J. Opt. Soc. Am., Vol. 66, No. 9, September 1976) and "Wavefront Sensing by Phase Retrieval" (SPIE. Vol. 207, Applications of Digital Image Processing III, 1979), $$E(\vec{f}) = \frac{\left|I(\vec{f})\hat{H}_d(\vec{f}) - I_d(\vec{f})\hat{H}(\vec{f})\right|^2}{\left|\hat{H}(\vec{f})\right|^2 + \left|\hat{H}_d(\vec{f})\right|^2}, \quad (13)$$

The carat symbol ^ above the OTF and diversity OTF indicate that these quantities are estimated. This and other known error equations need modification according to the teachings of this disclosure to work generally using the wavelength diversity methodology when large wavelength separations are employed between the primary image and the simultaneously captured diversity image.

Object brightness (e.g., Watts/cm²) has posed a problem for prior wavelength diversity compensation methods. For example, the error metric in equation (13) assumes that the object brightness and the diversity object brightness are the same—hence they divide out in the derivation process of this known equation. This is true for the phase diversity approach but not always true for the wavelength diversity approach. In wavelength diversity, the object brightness changes as a function of wavelength. As an example, looking at the red, green and blue components of an RGB image, a given object's brightness can be significantly different at each of the red, green and blue color components. This means that equation (13) does not remain valid except for cases where the different wavelength image (e.g. diversity image) is close to the original image. Equation (13) cannot be used for the wavelength diversity method in the general case where wavelength separations between the image and diversity image may be large. For example, this prior art technique is not expected to be reliable for separations of greater than approximately 10% or 40 nanometers.

Others have noted this shortcoming. For example, in "Parallel multiframe blind deconvolution using wavelength diversity", H. R. Ingleby and others ("Ingleby") described an alternate error metric that supposedly mitigated the object brightness issue, proposing the following error metric (Proceedings of the SPIE, Volume 5562, pp. 58-64, October 2004):

$$E_m(a_{kn}) = \sum_v \left[ \sum_{n=1}^N |I_{mn}|^2 - \frac{\left|\sum_{n=1}^N H_{mn}^* I_{mn}\right|^2}{\sum_{n=1}^N |H_{mn}|^2} \right] \quad (16)$$

and, $$O_m = \sum_{n=1}^N H_{mn}^* I_{mn} \Big/ \sum_{n=1}^N |H_{mn}|^2, \quad (17)$$

where the "m" index sums over wavelengths, the "n" index sums over the number of frames (e.g. snapshots taken at different time intervals), the "v" index sums over spatial frequency locations in the entrance pupil of the imaging system, and the "k" index runs over the Zernike modes. The "a" coefficient is the estimated weight on the "$k^{th}$" Zernike mode of the $n^{th}$ frame. The object estimate for the $m^{th}$ wavelength component is then given by equation (17), which follows from application of linear systems theory. Equation (16) has the unfortunate characteristic, however, that it goes to zero for any arbitrary choice of $H_m$ when the number of frames is identically one (e.g. for a single snapshot). Therefore, equation (16) is unsuitable for WD systems that only have one frame of data (e.g. a single snapshot).

In traditional diversity-based atmospheric turbulence compensation methods, the process for estimating the OTF (and also the diversity OTF by analogy) includes:

1. Using a suitable basis set like the Zernike polynomials initially to generate an entrance pupil plane-phase estimate. This is typically done by initially guessing the phase—for example, assuming that all phase values are zero;
2. Forming the generalized pupil function with this entrance pupil phase "guess" using equation (10). Equations (11) or (12) are typically selected for estimating the diversity OTF;
3. Zero-packing the GPF for sampling reasons in preparation of generating an OTF estimate;
4. Forming the impulse response in accordance with equation (9);
5. Determining the PSF estimate by point-wise taking the magnitude squared of the result of step 4 above;
6. Using equation (8) to form the OTF estimate;
7. After forming both the OTF and diversity OTF estimate, applying an error metric such as the Gonsalvez error metric given in equation (13) and optionally one or more constraints known to one of ordinary skill in the art to determine the instantaneous error at each spatial location in the OTF. The constraints typically involve enforcing some physical aspect of the imaging problem such as positivity of the object brightness, applying conservation of energy principles, point spread function and image, and an experiment specific constraint such as including a pre-defined entrance pupil aperture size.
8. Summing the errors to determine the total summed error due to the initial entrance pupil plane phase estimation error;
9. Changing the weights on the Zernike polynomials in a methodical manner to come up with a new entrance pupil plane phase estimate;
10. Repeating steps 2 through 8 to generate a new error estimate;
11. Comparing the new error estimate to the old estimate and keeping the phase estimates associated with the lowest error; and
12. Continuing to execute steps 10 and 11 until the error is minimized and the best OTF estimate is obtained.

Once the error-minimized OTF estimate is obtained, a Wiener filter can be generated that removes the effect of atmospheric turbulence. The OTF itself is generated by phase estimates that are due to atmospheric turbulence effects and aperture effects (for example, diffraction effects). If the effects of the atmospheric turbulence are mitigated by filtering them out using the Wiener filter, then the only remaining effect is that due to diffraction, and so the diffraction-limited result is obtained. To attempt to remove the effects of the aperture, super-resolution methods can be employed.

After the error-minimized OTF estimate is determined, the Wiener filter is given by, $$H^{-1}(\vec{f}) = \frac{H^*(\vec{f})}{\left(|H(\vec{f})|^2 + \alpha\right)}, \quad (14)$$

where the asterisk on the right side of equation (14) represents complex conjugation. Care must be taken for the case where the denominator of equation (14) approaches zero. A parameter $\alpha$ based on system noise is sometimes included in the denominator to prevent equation (14) from blowing up as $H(\vec{f})$ approaches zero. As can be seen from equation (7), multiplying the image spectrum by the Wiener filter leads to an unaberrated object spectrum, $$O(\vec{f}) = I(\vec{f}) H^{-1}(\vec{f}), \quad (15)$$

and the atmospheric turbulence free object brightness estimate is simply obtained by taking the 2-D inverse Fourier transform of equation (15).

Needed are embodiments of modified wavelength diversity compensation that overcome or mitigate one or more of the deficiencies of the prior art.

SUMMARY

In a first aspect, an exemplary image compensation system is disclosed that provides improved wavelength diversity compensation to an image of a subject to compensate for turbulence existing in the line of sight between the subject and an optical imaging device used to capture the image. The image compensation system may have a communications port adapted to receive a subject image set from the optical imaging device, with the subject image set including (i) a first image of the subject at a first wavelength, the first image having a first object brightness and at least (ii) a simultaneously captured second image of the subject at a second wavelength diverse from the first wavelength. The second image has a second object brightness, with the first image and the second image forming the subject image set. The image compensation system also has a memory device adapted to store the subject image set, and a processing device adapted to process the subject image set to generate an enhanced resolution version of a region of interest in the first image by applying a wavelength diversity compensation algorithm thereto. A corresponding region of interest in the second image is used as the diverse wavelength image in the wavelength diversity compensation algorithm. The algorithm is adapted to use an error metric that remains valid for images differing in optical brightness. The image compensation system further has an output device adapted to output the enhanced resolution version of the region of interest in the first image.

In some embodiments, the error metric includes error metric means for generating an error-minimized optical transfer function. In some embodiments, the communications port is further adapted to receive the subject image set as component images output from the optical imaging device at respective wavelengths corresponding to the color components of a color scheme and the first wavelength and the second wavelength of the subject image set correspond to diverse color components of the color scheme.

In some embodiments, the enhanced resolution version of the region of interest of the first image is generated in real time using a field programmable gate array or a general purpose parallel processing device. In some embodiments, the enhanced resolution version of the region of interest of the first image is generated at a rate faster than 30 Hz using a field programmable gate array or a general purpose parallel processing device. In some embodiments, the output device is adapted to output the enhanced resolution version of the region of interest in the first image for use in a system selected from the group consisting of: a visual display system, a surveillance system, a reconnaissance system, a facial recognition system, an identification system, a tracking system, a targeting system and combinations thereof.

In a second aspect, disclosed is an exemplary method of using an image compensation system to provide improved wavelength diversity compensation to an image of a subject to compensate for turbulence existing in the line of sight between the subject and an optical imaging device used to capture the image. The method includes the step of receiving a subject image set from the optical imaging device, the subject image set including (i) a first image of the subject at a first wavelength, the first image having a first object brightness and at least (ii) a simultaneously captured second image of the subject at a second wavelength diverse from the first wavelength, the second image having a second object brightness, the first image and the second image forming the subject image set. The method further includes storing the subject image set in memory associated with the image compensation system. The method includes processing the subject image set in a processing device associated with the image compensation system to generate an enhanced resolution version of a region of interest in the first image by applying a wavelength diversity compensation algorithm thereto, wherein a corresponding region of interest in the second image is used as the diverse wavelength image in the wavelength diversity compensation algorithm. The algorithm includes an error metric that remains valid for images differing in optical brightness. The method includes outputting the enhanced resolution version of the region of interest in the first image.

In some embodiments, the error metric includes error metric means for generating an error-minimized optical transfer function. In some embodiments, the optical imaging device outputs component images at wavelengths corresponding to the color components of a color scheme and the first wavelength and the second wavelength of the subject image set correspond to diverse color components of the color scheme. In some embodiments, the color scheme is a RGB color scheme. In some embodiments, the first wavelength differs from the second wavelength by at least 10%. In some embodiments, the first wavelength differs from the second wavelength by at least 40 nanometers.

In some embodiments, the enhanced resolution version of the region of interest of the first image is generated in real time using a field programmable gate array or a general purpose parallel processing device. In some embodiments, the enhanced resolution version of the region of interest of the first image is generated at a rate faster than 30 Hz using a field programmable gate array or a general purpose parallel processing device. In some embodiments, the subject image set is captured in a single frame. In some embodiments, the enhanced resolution version of the region of interest in the first image is near the diffraction limit. In some embodiments, the region of interest in the first image is a region less than the entirety of the first image.

In some embodiments, the outputting of the enhanced resolution version of the region of interest in the first image includes outputting to a system selected from the group consisting of: a display system, a surveillance system, a reconnaissance system, a facial recognition system, an identification system, a tracking system, a targeting system and combinations thereof. In some embodiments, the optical imaging device includes hardware selected from the group consisting of: a camera, a video recorder, a SLR imaging device, a RGB imaging device, a digital imaging device, optical lenses, a telescope, binoculars, a periscope and combinations thereof. In some embodiments, the turbulence is naturally occurring atmospheric turbulence existing in a body of air between the optical imaging device and the subject.

BRIEF DESCRIPTION OF THE DRAWINGS

FIG. 3 shows color images of a simulated atmospheric-turbulence-compensated image in accordance with some embodiments of the invention.

DETAILED DESCRIPTION

This detailed description of certain exemplary embodiments is intended to be read in connection with the accompanying drawings, which are to be considered part of the entire written description. Terms and depictions concerning connections and attachments and the like, such as "connected" and "interconnected," refer to a relationship wherein objects are attached or communicate with each other either directly or indirectly through intervening structures, as well as both movable or rigid attachments or relationships, unless expressly described otherwise. Likewise, terms and depictions concerning coupling and the like, such as "coupled," "connected" and "interconnected," or "associated" refer to a relationship wherein objects communicate with one another either directly or indirectly through intervening structures, unless expressly described otherwise.

Figure 2:
FIG. 2 is a black and white image showing a simulated atmospheric-turbulence-compensated version of the image of FIG. 1 in accordance with some embodiments of the invention.
Figure 1:
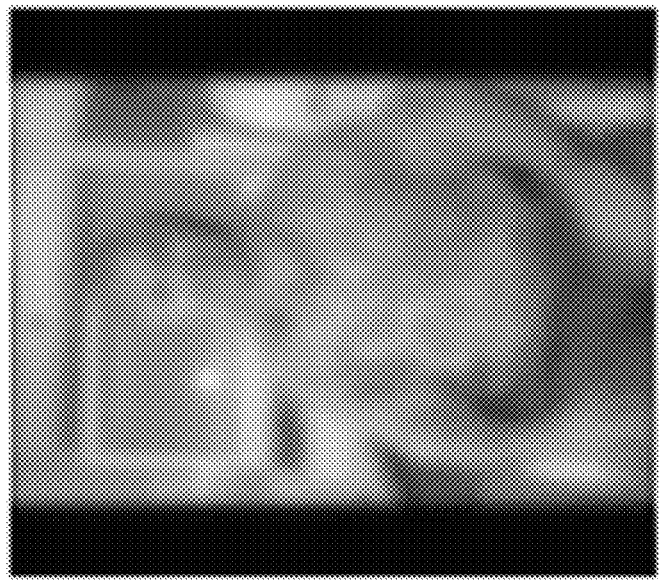
FIG. 1 is a black and white image showing simulated atmospheric turbulence effects.

FIG. 2 shows the simulated diffraction-limited, image from the same imaging system of FIG. 1, but simulated to have been atmospheric-turbulence-compensated according to some embodiments described herein. The images demonstrate the increase in spatial resolution possible by compensating for the effects of atmospheric turbulence. From FIG. 1, it can be seen that even if a "perfect" (aberration-free) imaging system could be built (for example, a camera with no optical system aberrations), the presence of atmospheric turbulence still severely degrades the imaging system's performance in terms of achievable spatial resolution and that compensating or correcting for the effects of atmospheric turbulence can significantly improve the overall image quality.

FIG. 3 shows a simulated color compensated image using embodiments of the disclosed modified wavelength diversity technique.

Figure 4:
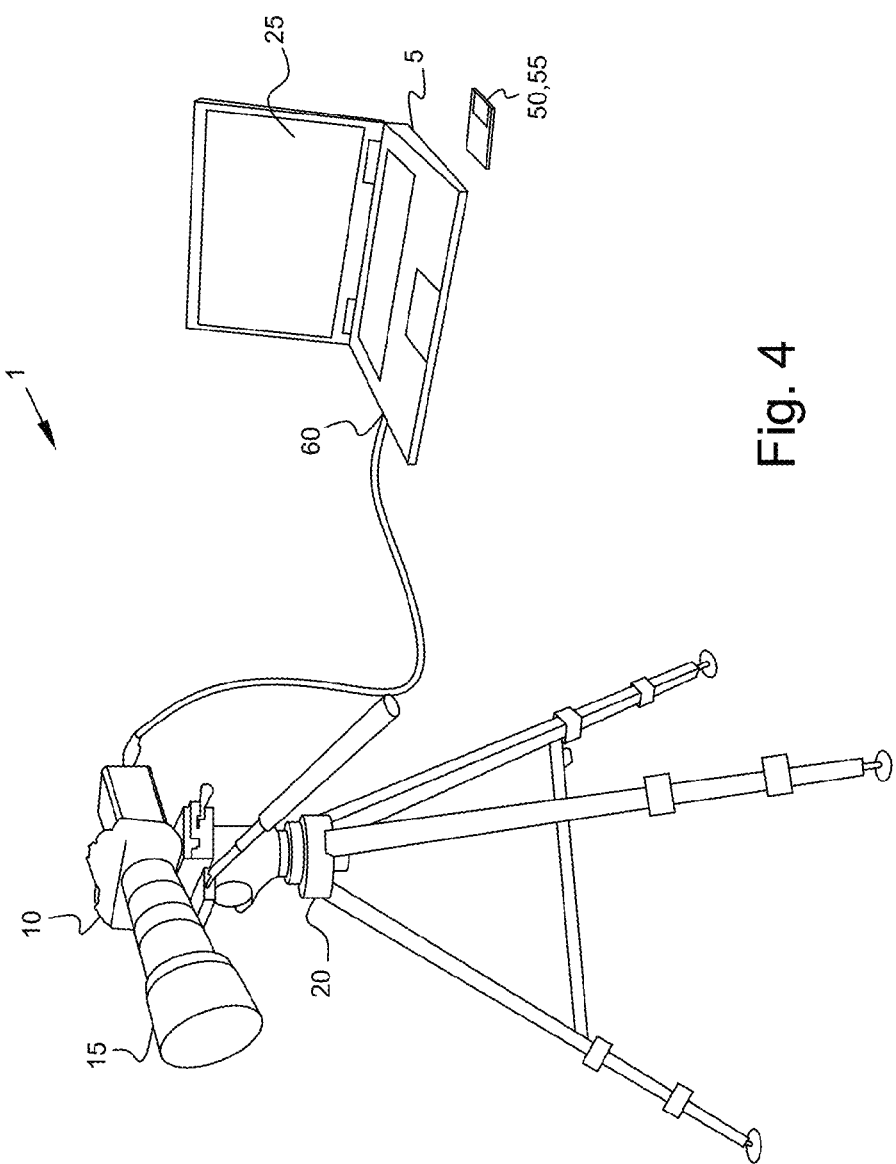
FIG. 4 shows equipment that can be used in some embodiments of the present invention.

FIG. 4 shows an exemplary image compensation system 1 in which some embodiments of the modified wavelength diversity method disclosed herein are implemented using a laptop computer 5, camera 10 and telescopic lens 15. Tri-pod 20 may be used to stabilize portions of image compensation system 1. Alternatively, gyroscope stabilized gimbals may be used for more advanced image compensation systems, for example, systems mounted on moving vehicles or aircraft. In various embodiments, camera 10 may be substituted with a video recorder (not shown) or other type of optical imaging device. For example, in some embodiments, a telescope may be fitted with a charge coupled device (CCD) to form the optical imaging device.

The optical imaging device should preferably obtain sufficient signal-to-noise to form an image set of a subject, for example, enough signal to capture a blurry image such as those shown in FIGS. 1 and 3. As used herein, a subject can be anything of interest viewed by a optical imaging device, including for example such ready examples as an object, a person, a target, a suspect, an aircraft, an astronomical event, etc.

Laptop 5 includes a communications port 60 adapted to receive the respective color component outputs of camera 10. In some embodiments camera 10 outputs color components according to an RGB scheme.

In some embodiments, laptop 5 advantageously has several output devices for displaying, storing or transmitting enhanced imagery. Laptop 5 includes display 25 to show a user enhanced, high-resolution images. Laptop 5 includes a processing device, such as a multicore general purpose processor for processing images captured by camera 10. Laptop 5 further includes cache and RAM memory for temporary storage of image data during processing. Laptop 5 has readily accessible internal hard disk drive useful for storing image processing software, and the storage of image data, including the enhanced, high-resolution images output by the modified diversity wavelength techniques disclosed herein. Laptop 5 may output the enhanced imagery to associated software or systems to further utilize the enhanced imagery generated, such as outputting the images to facial recognition software, target identification software, or the like.

In some embodiments, the processing power of laptop 5 can also be easily supplemented using a real-time parallel processing device implemented in a Field Programmable Gate Array (FPGA) or a general purpose parallel processor (GPPP). A removable GPPP or FPGA, for example, may be used to increase the speed or amount of image data that can be suitably processed for enhancement. Referring to FIG. 4, GPPP 50 is embodied on a Personal Computer Memory Card International Association (PCMCIA) Express Card 55 to increase the processing power of laptop 5. Similarly, a USB stick could house a FPGA (not shown) to supplement processing power of laptop 5.

In some embodiments, the techniques disclosed herein work directly with existing commercial-off-the-shelf ("COTS") camera and video systems. Some embodiments may increase the resolution of the imaging system by a factor of approximately 22, for example, for an 8-inch diameter telescopic imaging system operating in the visible wavelengths.

Figure 6:
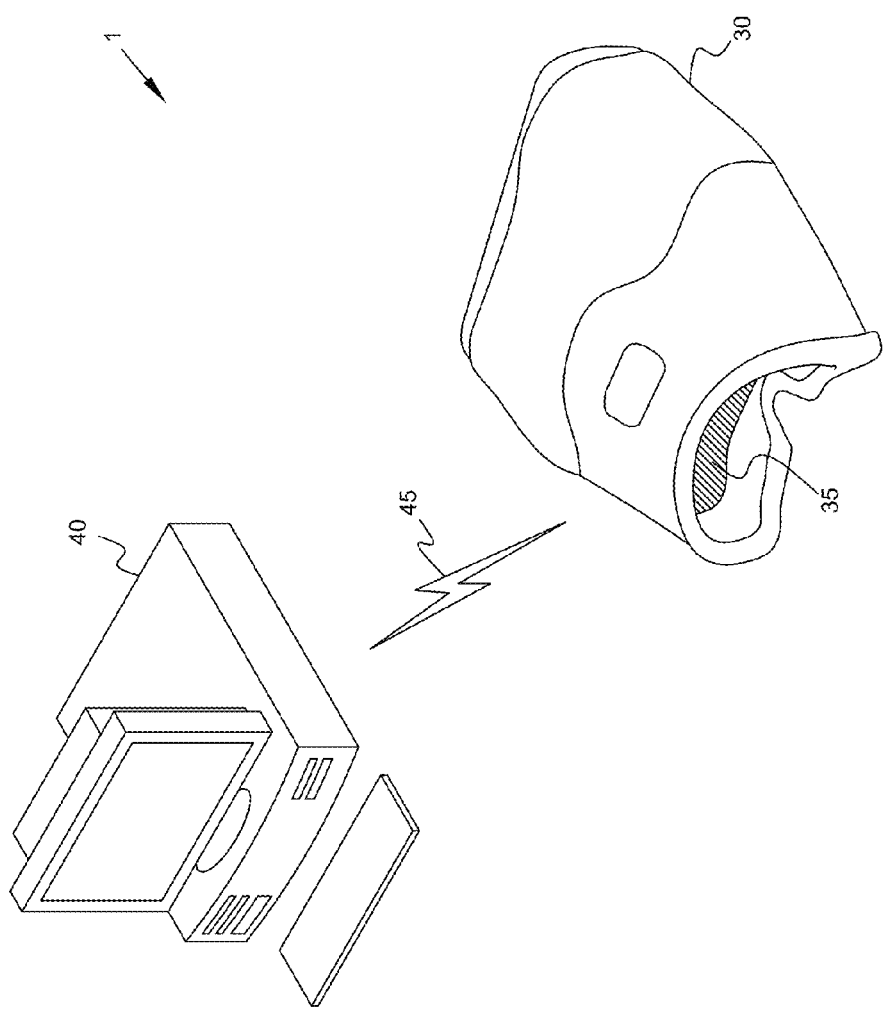
FIG. 6 shows equipment that can be used in some embodiments of the present invention.

In some embodiments, enhanced images may be displayed on other devices. For example, FIG. 6 shows an image compensation system 1 that is embodied in a pair of binoculars 30 where the user looks at a charge coupled device ("CCD") display 35. Other suitable displays may include a liquid crystal display ("LCD") or the like. In some embodiments such as the one shown in FIG. 6, the image compensation algorithm can reside in processing hardware embedded in the binoculars 30.

Alternatively, processing hardware may be located remotely, for example, in a remote server. This may be particularly advantageous for portable implementations of image compensation system 1, such as the one shown in FIG. 6, or one making use of the features of a portable digital assistant, smart phone or tablet device. Communication to such a remote processing platform may utilize wireless or wired communication mediums. Referring to FIG. 6, for example, binoculars 30 may be equipped with a wireless transceiver (not shown) able to transmit captured image data wirelessly to remote server 40 via wireless network 45. Wireless network 45 may be any suitable wireless data network, including, for example, a network utilizing satellite communication, WiMax, WiFi, GSM, CDMA, bluetooth, or other network technology. Remote server receives image data from the optical imaging device via a communications port suitable to the networking technology utilized. For example, where the wireless network is utilizing WiMax, the communications port may include a WiMax transceiver. After receiving the subject image set from binoculors 30, remote server 40 processes the image set to mitigate or remove turbulence effects, and transmits the enhanced images back to binoculars 30 for viewing on display 35 by the user.

In some embodiments, remote server 40 may additionally provide the enhanced images to other systems or machines, which may in turn provide further useful information. For example, facial recognition software or a target identification system may further process the enhanced images to identify the subject or target viewed by the imaging binoculars 30. Remote server 40 may then transmit identity information such as a subject's name or the type of vessel, along with the enhanced imagery, back to the binoculars 30 for viewing by the user on display 35.

In various similar embodiments, the enhanced images need not be displayed to a human, but may alternatively provide the enhanced image to a machine or system. For example, the enhanced image may be used as part of an automated target identification and tracking system. The enhanced image may likewise be used as part of the targeting system of a larger weapons system. The enhanced imagery may aid in the automatic identification of a potentially hostile vessel, vehicle or aircraft faster or at a greater range than current image processing capability. In another example, the enhanced image may be of a person, and provided to a facial recognition system or software, and may further be uploaded automatically to a surveillance or reconnaissance system.

In some embodiments, the techniques disclosed may preferably work with a single image frame of simultaneously captured wavelength diversity images and so can be used to capture objects moving relative to optical imaging system 1. The underlying camera system may be standard or high speed, depending on the relative speed of the objects that need to be imaged. The camera system need only have an integration time fast enough to effectively "freeze" the particular object of interest.

Some embodiments correct and adapt an error metric that is useful in wavelength diversity image compensation viable even on images captured in a single fame. While error metric is operable on images captured over multiple frames, unlike certain prior art techniques, multiple frames are not required. A single frame WD compensation method is advantageous in that WD compensation can be applied to targets moving relative to the optical imaging device capturing the image. In some embodiments, a set of two or more images (e.g. an image and one or more associated WD images, or alternatively multiple image pairs) are captured simultaneously, mitigating adverse effects of rapidly changing backgrounds.

In a typical system implementation for some embodiments, the imaging system's integration time should be short enough to effectively freeze the relative motion of the object of interest. One of ordinary skill in the art would understand what time frames are suitable for a given application, but generally speaking in the context of current technology, an imaging system's integration time on the order of 1 to 5 milliseconds would effectively freeze the relative motion of most objects of interest.

In some embodiments, the techniques disclosed herein can provide a way to compensate for atmospheric turbulence in ground-to-ground imagery with optical path lengths of, for example, 5 km. In other embodiments, the techniques apply to other scenarios, such as ground-to-air, ground-to-space, air-to-ground, or space-to-ground atmospheric turbulence compensation scenarios. The techniques disclosed can be implemented on a variety of hardware platforms such as Field Programmable Gate Arrays (FPGAs), ASICs, neural network chips, graphics processing units (GPUs), distributed processing environments, cloud computing environments, single and/or multi-core processors. In some embodiments, by implementing the WD techniques disclosed herein on general-purpose parallel-processing devices, atmospheric turbulence compensated imagery can be provided in real-time. Some embodiments can achieve, for example, rates faster than 30 Hz using commercial-off-the-shelf (COTS) components.

In various embodiments, the system components may include imaging components such as a camera, video camera, telescope, periscope, or other set of lenses. The system may also include various processing components, such as software, a laptop computer, a GPPP on, e.g., a PCMCIA Express card, USB, or separately housed device, and user interface software. In some embodiments, the laptop need not, but may have a real-time parallel processing device such as a Field Programmable Gate Array (FPGA) or alternative general purpose parallel processing device (GPPP). A communication port (not shown) may be utilized to receive image outputs from a camera, video camera or other optical imaging device. The processing components may be adapted specifically for the intended imaging components or may be designed to be compatible with multiple types of imaging components.

The use of a GPPP may be desirable for some embodiments where attaining high-speed compensation is desirable.

Figure 5:
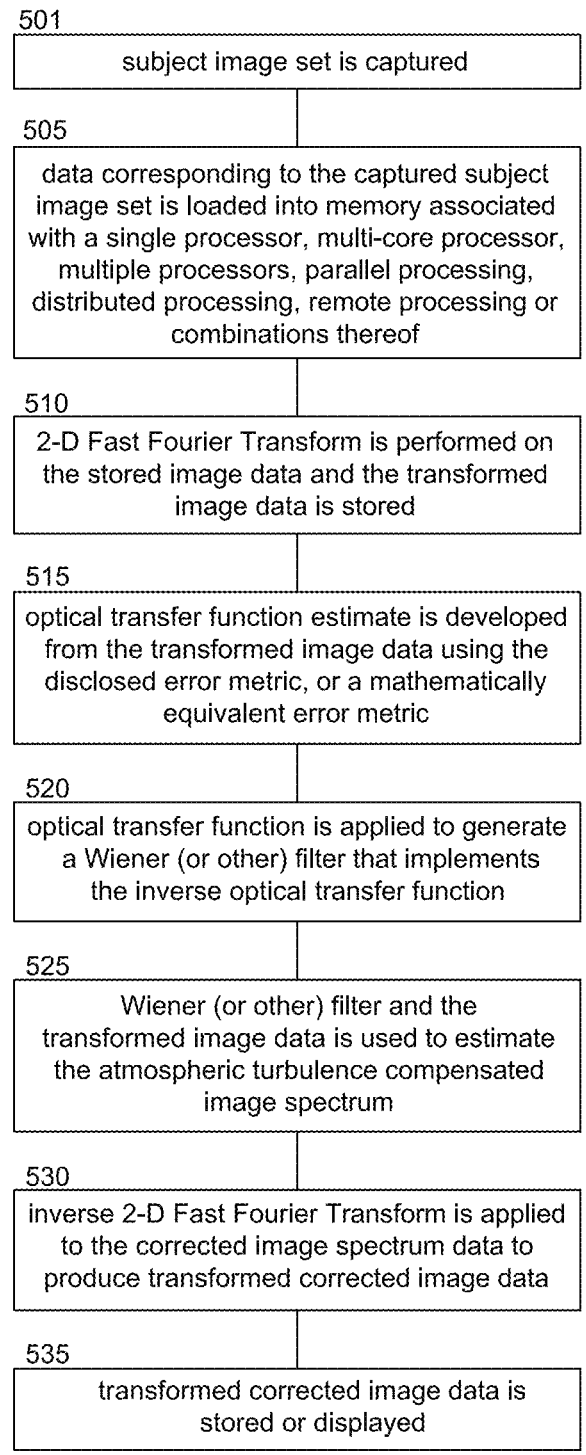
FIG. 5 shows process steps that can be used in some embodiments of the present invention.

FIG. 5 summarizes process steps of some embodiments of the present invention. In step 501, a subject image set is captured. In step 505, data corresponding to the captured subject image set is loaded into memory associated with a single processor, multi-core processor, multiple processors, parallel processing, distributed processing, remote processing and combinations thereof. In step 510, a 2-D fast Fourier Transform is performed on the stored image data and the transformed image data is stored. In step 515, an optical transfer function estimate is developed from the transformed image data using the disclosed error metric, or a mathematically equivalent error metric. In step 520, the optical transfer function is applied to generate a Wiener filter or other appropriate filter that implements the inverse optical transfer function. In step 525, the Wiener (or other) filter and the transformed image data is used to estimate the atmospheric turbulence compensated image spectrum. In step 530, an inverse 2-D Fast Fourier Transform is applied to the corrected image spectrum data to produce transformed corrected image data. In step 535, the transformed corrected image data is stored. The steps of FIG. 5 are further discussed below.

In some embodiments, an imaging method providing atmospheric turbulence compensation includes capturing a subject image set. The subject image set refers to at least two images of the same subject captured simultaneously, but having different wavelengths. Imaging equipment using a RGB scheme provides multiple suitable image sets because the equipment simultaneously captures red, green and blue wavelength image data. Data corresponding to the captured subject image set may then be loaded into memory associated, for example, with a single processor, multi-core processor, multiple-processors, distributed processors, remote processors, a parallel processing device or a combination of such processing platforms. A 2-D Fast Fourier Transform may be performed on the stored image data and the resulting transformed image data may then be stored. An optical transfer function may then be developed from the transformed image data and iteratively solving the error metric disclosed herein. The optical transfer function may then be inverted and used to generate a Wiener filter function. The Wiener filter function may then be applied to the transformed image data resulting in a generally aberration-free image spectrum estimate. A 2-D inverse Fast Fourier Transform may then be applied to the generally aberration-free image spectrum estimate to generate corrected image data, which is thereby compensated for atmospheric aberrations. The transformed corrected data may then be stored, and/or possibly transmitted to an alternate location through a variety of means. These general steps are outlined in the functional flow diagram shown in FIG. 5.

Capturing the subject image set can include simultaneously capturing two images of a target—a primary image and one or more wavelength diverse images. In some embodiments, the subject image set is a subject image pair. Increasing the number of diverse images may require additional processing power, while providing potential advantages in quality. Capturing the subject image set can include collecting sample points of each image at the entrance pupil plane of an image capture device (for example, the collecting aperture of a telescope). Developing the optical transfer function estimate can include using a suitable basis set such as the Zernike polynomials, Karhunen-Loeve expansion, or other acceptable basis sets to estimate a realization of the entrance pupil plane phase; form the generalized pupil function with this phase estimate; zero-pack the generalized pupil function (GPF); take a two-dimensional Fourier transform of the zero-packed GPF and obtain the impulse response; form the magnitude-squared of the impulse response and take the 2-D Fourier Transform; and obtain the OTF by dividing the result by its maximum value.

Developing the optical transfer function can also include estimating the optical transfer function based on an autocorrelation of a generalized pupil function of the image capture device.

In some embodiments, an error metric is implemented that generally works for both single and multiple image frames of simultaneously captured WD imagery. The error metric is used for generating an error-minimized optical transfer function. It is determined by first taking the ratio of the image spectrum at one wavelength and dividing by the image spectrum at another wavelength. This relationship holds at every point in the entrance pupil where the magnitude of the image spectrum for the term in the denominator is not zero. Relating the RGB components of the object brightness and projecting this relationship into frequency space determines the a parameter. The function of this error metric is to discriminate between varying choices of Zernike polynomials that are used to estimate the phase aberrations introduced by the atmosphere. The error is minimized (ideally attains the value of zero for noiseless systems and is minimized for systems with noise) by the correct choice of Zernike weights. In one specific implementation, an error metric that may be used to discriminate between different estimates of the optical transfer function obtained in the fashion described above is:

$$E_{mp}(a_{kn}) = \sum_{v} \left( \sum_{n=1}^{N} \left| \frac{I_{mn}}{I_{pn}} - \tan\alpha_{mp;n} \frac{\hat{H}_{mn}}{\hat{H}_{pn}} \right|^2 \right), \quad (17)$$

where "m" and "p" are different wavelengths, "k" is an index running over the Zernike modes, "n" is an index over the number of WD simultaneously captured image frames, "v" is an index running over all the spatial frequencies in the clear aperture of the entrance pupil, the " ˆ " symbol means estimate, and the "α" coefficient is the weighting coefficient on the "$k^{th}$" Zernike polynomial in the "$n^{th}$" image frame of data. Note that if the "n" index were dropped in the equation above, this would correspond to a single image frame. If the imaging system happens to use a digital single lens reflex ("SLR") camera using a RGB color scheme, then "m" and "p" could correspond to one of 3 wavelengths—red, green, and blue— and $E_{mp}$ would correspond to the error metric used with any two of the three colors (e.g. m, p=1 {blue}, 2 {green} and 3 {red}). The parameter is an angle obtained by estimating the arctangent of the ratio of the $m^{th}$ and $p^{th}$ RGB components of the object brightness. When a RGB color scheme is used, this would therefore range on the inclusive interval [0, pi/2]. By using all three color components in the RGB image, three separate error metrics result from equation (17). In some embodiments, these equations are linked and constrained and all three are advantageously minimized. The error metric may be evaluated at every spatial frequency point in the entrance pupil plane, summed, and minimized using an optimization routine such as simulated annealing (SA), gradient-descent, or a variety of deterministic, stochastic, or mixed methods. As previously discussed, known constraints can also be used to restrict the search space. Once the error is minimized, the optimal OTF estimate is obtained and equation (14) and (15) can be used to obtain the atmospheric turbulence compensated object brightness spectrum estimate. The object spectrum can also be estimated directly from, $$\hat{O}^{\lambda_1,n} = \left( \frac{I_{\lambda_1 n}\hat{H}^*_{\lambda_1 n} + I_{\lambda_2 n}\hat{H}^*_{\lambda_2 n}}{|\hat{H}_{\lambda_1 n}|^2 + \tan\alpha_{21;n}|\hat{H}_{\lambda_2 n}|^2} \right), \quad (18a)$$

and, $$\hat{O}^{\lambda_2,n} = \left( \frac{I_{\lambda_2 n}\hat{H}^*_{\lambda_2 n} + I_{\lambda_3 n}\hat{H}^*_{\lambda_3 n}}{|\hat{H}_{\lambda_2 n}|^2 + \tan\alpha_{32;n}|\hat{H}_{\lambda_3 n}|^2} \right), \quad (18b)$$

and, $$\hat{O}^{\lambda_3,n} = \left( \frac{I_{\lambda_1 n}\hat{H}^*_{\lambda_1 n} + I_{\lambda_3 n}\hat{H}^*_{\lambda_3 n}}{|\hat{H}_{\lambda_3 n}|^2 + \frac{1}{\tan\alpha_{31}}|\hat{H}_{\lambda_1 n}|^2} \right), \quad (18c)$$

where, $$\hat{O}^{\lambda_2} = \tan\alpha_{21}\hat{O}^{\lambda_1} \quad (18d)$$
$$\hat{O}^{\lambda_3} = \tan\alpha_{31}\hat{O}^{\lambda_1}$$
$$\hat{O}^{\lambda_3} = \tan\alpha_{32}\hat{O}^{\lambda_2}$$

and, $$V = \sqrt{(O^{\lambda_1})^2 + (O^{\lambda_2})^2 + (O^{\lambda_3})^2}. \quad (18e)$$

In the above equations, "n" once again is an index over the image frames and "hatted" "O's" represent the estimated object brightness at the specified wavelength. These object brightness estimates correspond to the red, green, and blue object brightness if an RGB color scheme is used. The equations (18d) and (18e) are example constraints. Other known constraints may be used that fall into the categories of positivity constraints (e.g. the object brightness, point spread function, and image are all values greater than or equal to zero and are real valued at every sampled point), constraints on the real and imaginary parts of the image spectrum and diversity image spectrum, conservation of energy or power, and inclusion of application specific details such as aperture size.

When looking at the steps in the wavelength diversity atmospheric turbulence compensation method presented above, consideration should be given to sampling of both the object in terms of the number of projected pixels across the object with respect to the diffraction limited resolution cell projected on the object, and to pupil plane sampling associated with Nyquist sampling requirements.

To avoid or improve aliasing, sufficient sample points should be collected across the entrance pupil plane (e.g collecting aperture of the telescope). If the image is band-limited and has significant value only over a finite region of the sampled entrance pupil plane, it is possible to reconstruct the object brightness with acceptable accuracy using a finite number of samples. If the object spectrum lies within the region of the entrance pupil bounded by $$-L_x \le x \le L_x$$

and $$-L_y \le y \le L_y \quad (18)$$

and is sampled in accordance with the Whittaker-Shannon sampling theorem on a rectangular lattice, the total number of sampled points is known to be $$M = 16 \, L_x L_y B_x B_y, \quad (19)$$

where $L_x$ and $L_y$ are the maximum dimensions in a particular linear direction of the aperture, M is the number of sample points, and $B_x$ and $B_y$ are the spatial frequency resolution requirements to avoid aliasing. Since the various sampled points in the image spectrum are separated by the distances 1/x and 1/y in the $f_x$, and $f_y$ directions, separation of the spectral regions may advantageously be $$x \le (2B_x)^{-1}$$

and $$y \le (2B_y)^{-1} \quad (20)$$

The images at both wavelengths may be sampled and sent to a laptop, or other suitable processing hardware. The processor performs a 2-D fast Fourier transform (2-D FFT) and stores the images.

A 256 by 256 image segment or other image segments may be used. A sub-set of the image may need to be processed that is on the order of (or less) than the image segment given by the isoplanatic patch.

Thus, image enhancement may focus on a region of interest that is less than or equal to the captured image. Where a smaller region of interest is used, corresponding regions of interest in the diverse images are used in the wavelength diversity compensation algorithm.

Inputs from both wavelengths of the image spectrum may be loaded into the filter to develop an inverse Wiener filter. Applying the developed inverse Wiener filter to the image spectrum may then advantageously allow turbulence correction for aberrations in the image spectrum. The corrected object spectrum then has a 2-D inverse fast Fourier transform applied (IFFT) and the unaberrated object brightness is then determined.

Figure 7:
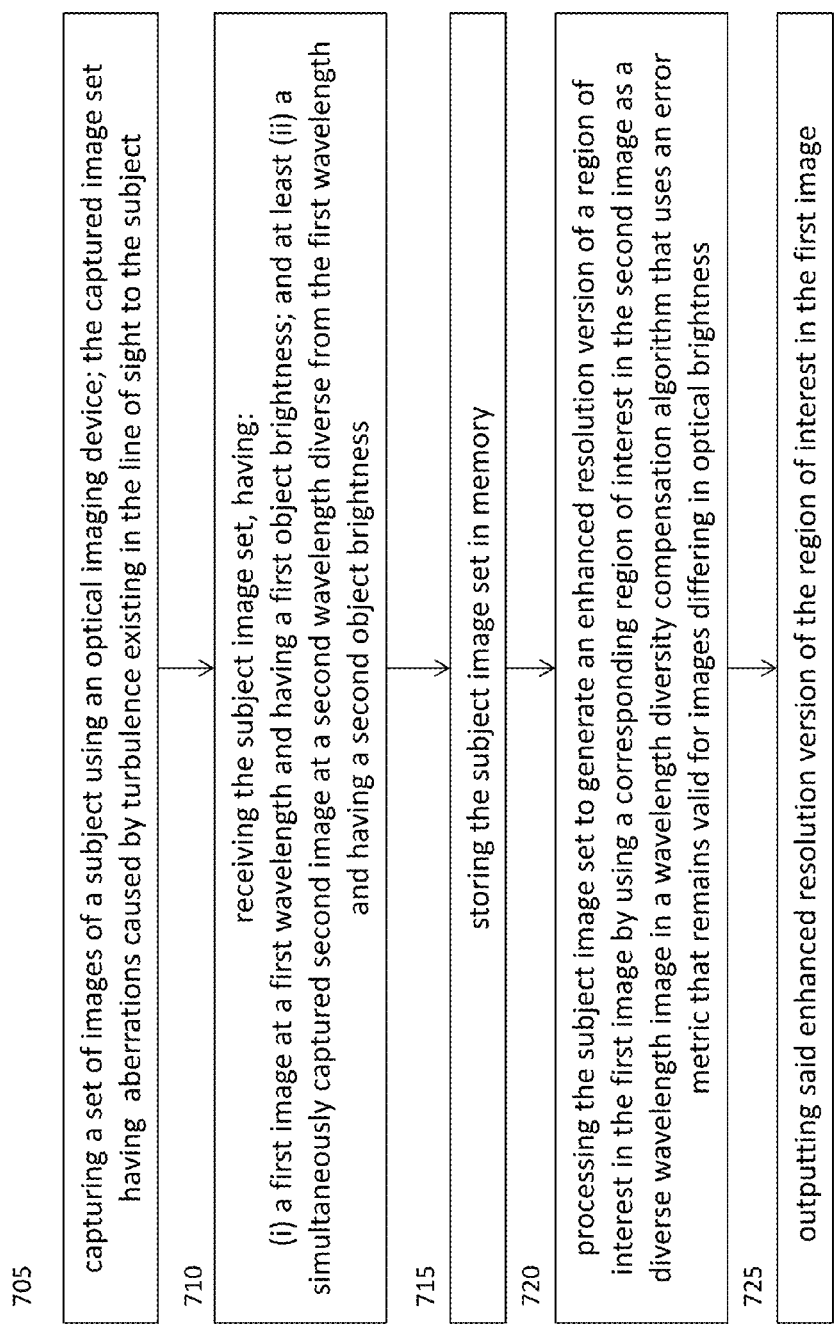
FIG. 7 shows process steps that can be used in some embodiments of the present invention.

Referring now to FIG. 7, illustrated are process steps applicable to some embodiments of the present invention. In step 705, a set of images are captured by an optical imaging device. The captured image set has aberrations caused by turbulence existing in the line of sight to the subject being imaged. In order to improve resolution of the image, a modified wavelength diversity compensation is required. In step 710, the captured subject image set is received by an image compensation system. The subject image set includes (i) a first image at a first wavelength and having a first object brightness; and at least (ii) a simultaneously captured second image at a second wavelength diverse from the first wavelength and having a second object brightness. Once received, the subject image set is stored in memory for processing. In step 720, the subject image set is processed to generate an enhanced resolution version of a region of interest in the first, aberrated image by using a corresponding region of interest in the second image as a diverse wavelength image in a wavelength diversity compensation algorithm. The algorithm uses an error metric that remains valid for images differing in optical brightness. For example, the error metric is valid even where the first and second images are two of the color components of an RGB scheme having different object brightness. Then, in step 725, the optical imaging system outputs the enhanced resolution version of the region of interest in the first image.

The techniques disclosed herein may be advantageously applied to single WD image pair and can advantageously be applied to widely separated wavelengths, for example, the red, green and blue images from standard RGB formatted color images.

The techniques and teachings disclosed herein are applicable to, for example, enhancing images of targets of interest in the optical and infrared regions of the electromagnetic spectrum. Targets of interest may be with regard to surveillance, military, law enforcement, homeland security, intelligence community, the media, astronomy, laser imaging, or any general purpose high resolution imaging applications. The methods disclosed provide high spatial resolution images at near diffraction limited imagery by removing the effects of turbulence, such as atmospheric turbulence, from collected images in near real time, approximately 1 second processing time and better. The method disclosed herein may be applied to various image formats, including 2048 by 2048 pixels as well as smaller image segments such as a 256 by 256 pixel image segment (e.g. an area of interest in a larger image). The spatial resolution performance increase provided by the disclosure should approach a $D/r_0$ improvement in the image's spatial resolution where D is the diameter of the imaging systems entrance pupil (e.g. telescope diameter, or lens diameter) and $r_0$ is the Fried parameter or atmospheric coherence length. The methods disclosed herein may be combined or complimented with other known image processing techniques for further enhancement.

The teachings and techniques disclosed herein can be implemented and applied to methods, apparatus and systems in various embodiments without departing from the spirit and scope of the invention, and it is to be understood that the invention is not limited to the specific details and examples of embodiments provided. It will be recognized, for example, that the methods and systems disclosed may comprise or utilize a single device or a system constituted by a plurality of devices. Furthermore, it will be recognized that embodiments of the invention can be implemented by software or firmware suitably stored in known mediums.

It will be further recognized that the references herein to atmospheric turbulence compensation is one exemplary application of the present invention, and that the invention is equally suitable for compensating other aberrations in images caused by other forms of turbulence in other mediums. Other forms of known turbulence include fixed aberrations in an optical system. Turbulence may exist in other mediums such as fluids, which have more severe turbulence effects, causing stronger aberrations over shorter differences. One of ordinary skill will appreciate that the methods described herein may be adapted to the nature of a given source of turbulence and medium without departing from the scope and spirit of the invention.

I claim:

1. An image compensation system for providing improved wavelength diversity compensation to an image of a subject to compensate for turbulence existing in the line of sight between the subject and an optical imaging device used to capture the image, the image compensation system comprising:
a communications port adapted to receive a subject image set from said optical imaging device, the subject image set including (i) a first image of the subject at a first wavelength, the first image having a first object brightness and at least (ii) a simultaneously captured second image of the subject at a second wavelength diverse from the first wavelength, the second image having a second object brightness, the first image and the second image forming the subject image set;
a memory device adapted to store said subject image set;
a processing device adapted to process said subject image set to generate an enhanced resolution version of a region of interest in the first image by applying a wavelength diversity compensation algorithm thereto, wherein a corresponding region of interest in the second image is used as the diverse wavelength image in said wavelength diversity compensation algorithm, and wherein said algorithm is adapted to use an error metric that remains valid for images differing in optical brightness; and
a visual display operatively coupled to said processing device and capable of displaying said enhanced resolution version of said region of interest in the first image.

2. The image compensation system of claim 1, wherein the communications port is further adapted to receive said subject image set as component images output from said optical imaging device at respective wavelengths corresponding to the color components of a color scheme and said first wavelength and said second wavelength of said subject image set correspond to diverse color components of said color scheme.

3. The image compensation system of claim 1, wherein the enhanced resolution version of the region of interest of the first image is generated in real time using a field programmable gate array or a general purpose parallel processing device.

4. The image compensation system of claim 1, wherein the enhanced resolution version of the region of interest of the first image is generated at a rate faster than 30 Hz using a field programmable gate array or a general purpose parallel processing device.

5. The image compensation system of claim 1, further comprising an output interface adapted to output said enhanced resolution version of said region of interest in the first image for use in a system selected from the group consisting of: a surveillance system, a reconnaissance system, a facial recognition system, an identification system, a tracking system, a targeting system and combinations thereof.

6. A method of using an image compensation system to provide improved wavelength diversity compensation to an image of a subject to compensate for turbulence existing in the line of sight between the subject and an optical imaging device used to capture the image, the method comprising steps:
  receiving a subject image set from said optical imaging device, the subject image set including (i) a first image of the subject at a first wavelength, the first image having a first object brightness and at least (ii) a simultaneously captured second image of the subject at a second wavelength diverse from the first wavelength, the second image having a second object brightness, the first image and the second image forming the subject image set;
  storing the subject image set in memory associated with said image compensation system;
  processing said subject image set in a processing device associated with said image compensation system to generate an enhanced resolution version of a region of interest in the first image by applying a wavelength diversity compensation algorithm thereto, wherein a corresponding region of interest in the second image is used as the diverse wavelength image in said wavelength diversity compensation algorithm, and wherein said algorithm includes an error metric that remains valid for images differing in optical brightness; and
  outputting said enhanced resolution version of said region of interest in the first image.

7. The method of claim 6, wherein said error metric is used to generate an error-minimized optical transfer function.

8. The method of claim 6, wherein the optical imaging device outputs component images at wavelengths corresponding to the color components of a color scheme and said first wavelength and said second wavelength of said subject image set correspond to diverse color components of said color scheme.

9. The method of claim 8, wherein the color scheme is a RGB color scheme.

10. The method of claim 6, wherein said first wavelength differs from said second wavelength by at least 10%.

11. The method of claim 6, wherein said first wavelength differs from said second wavelength by at least 40 nanometers.

12. The method of claim 6, wherein the enhanced resolution version of the region of interest of the first image is generated in real time using a field programmable gate array or a general purpose parallel processing device.

13. The method of claim 6, wherein the enhanced resolution version of the region of interest of the first image is generated at a rate faster than 30 Hz using a field programmable gate array or a general purpose parallel processing device.

14. The method of claim 6, wherein said subject image set is captured in a single frame.

15. The method of claim 6, wherein the enhanced resolution version of the region of interest in the first image is near the diffraction limit.

16. The method of claim 6, wherein the region of interest in the first image is a region less than the entirety of said first image.

17. The method of claim 6, wherein the outputting of the enhanced resolution version of the region of interest in the first image comprises outputting to a system selected from the group consisting of: a display system, a surveillance system, a reconnaissance system, a facial recognition system, an identification system, a tracking system, a targeting system and combinations thereof.

18. The method of claim 6, wherein the optical imaging device comprises hardware selected from the group consisting of: a camera, a video recorder, a SLR imaging device, a RGB imaging device, a digital imaging device, optical lenses, a telescope, binoculars, a periscope and combinations thereof.

19. The method of claim 6, wherein the turbulence is naturally occurring atmospheric turbulence existing in a body of air between said optical imaging device and said subject.

* * * * *